United States Patent
Lee et al.

(10) Patent No.: US 12,256,153 B1
(45) Date of Patent: Mar. 18, 2025

(54) POLARIZATION VOLUME HOLOGRAM COMBINER ENABLING WIDE POPULATION COVERAGE, EYE TRACKING ACCURACY, AND GLINT GENERATION

(71) Applicant: META PLATFORMS TECHNOLOGIES, LLC, Menlo Park, CA (US)

(72) Inventors: Yun-Han Lee, Redmond, WA (US); Matthieu Charles Raoul Leibovici, Seattle, WA (US); Chulwoo Oh, Sammamish, WA (US); Hyunmin Song, Redmond, WA (US); Junren Wang, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 22 days.

(21) Appl. No.: 17/969,605

(22) Filed: Oct. 19, 2022

Related U.S. Application Data

(60) Provisional application No. 63/394,864, filed on Aug. 3, 2022.

(51) Int. Cl.
 *H04N 23/74* (2023.01)
 *G03H 1/02* (2006.01)
 (Continued)

(52) U.S. Cl.
 CPC .......... *H04N 23/74* (2023.01); *G03H 1/0248* (2013.01); *G06F 3/013* (2013.01); *H04N 23/56* (2023.01); *G03H 2260/33* (2013.01)

(58) Field of Classification Search
 None
 See application file for complete search history.

(56) References Cited

U.S. PATENT DOCUMENTS 7,242,702 B2   7/2007   Kopp et al.
8,077,914 B1   12/2011   Kaplan
(Continued)

FOREIGN PATENT DOCUMENTS

WO   WO-2021216252 A1   10/2021

OTHER PUBLICATIONS

Hua H., et al., "Video-Based Eyetracking Methods and Algorithms in Head-Mounted Displays," Optics Express, vol. 14, No. 10, May 15, 2006, pp. 4328-4350.
(Continued)

*Primary Examiner* — Talha M Nawaz
(74) *Attorney, Agent, or Firm* — Weaver Austin Villeneuve & Sampson LLP

(57) ABSTRACT

Various embodiments set forth eye tracking systems. In some embodiments, an eye tracking system includes a polarization volume hologram (PVH) combiner having a rolling k-vector design that provides relatively wide coverage of users whose eyeglasses prescriptions can vary. The PVH combiner can further include (1) fiducial regions created by differential patterning that generate dark regions in images captured of an eye, and/or (2) multiple regions that diffract light at angles to produce different perspectives in the captured images. The dark regions and/or different perspectives can be used to calibrate eye tracking. In addition, the PVH combiner can include off-axis lens regions that generate glints for the eye tracking.

20 Claims, 13 Drawing Sheets

(51) Int. Cl.
*G06F 3/01* (2006.01)
*H04N 23/56* (2023.01)

(56) References Cited

U.S. PATENT DOCUMENTS

| | | | |
|---|---|---|---|
| 9,341,846 B2 | 5/2016 | Popovich et al. | |
| 9,377,623 B2 | 6/2016 | Robbins et al. | |
| 10,423,222 B2 | 9/2019 | Popovich et al. | |
| 10,466,478 B2 | 11/2019 | Klug et al. | |
| 10,489,648 B2 | 11/2019 | Cavin et al. | |
| 10,816,939 B1* | 10/2020 | Coleman | G01S 17/86 |
| 10,914,950 B2 | 2/2021 | Waldern et al. | |
| 11,150,468 B1* | 10/2021 | Lee | G02B 27/0093 |
| 2014/0016051 A1* | 1/2014 | Kroll | G03H 1/02 |
| | | | 359/15 |
| 2015/0302252 A1 | 10/2015 | Herrera | |
| 2016/0077338 A1 | 3/2016 | Robbins et al. | |
| 2020/0229969 A1 | 7/2020 | Fix | |
| 2020/0371370 A1* | 11/2020 | Ouderkirk | G02B 5/3016 |
| 2020/0371474 A1* | 11/2020 | Ouderkirk | G03H 1/0256 |
| 2021/0112647 A1* | 4/2021 | Coleman | H05B 45/12 |
| 2021/0263342 A1 | 8/2021 | Ouderkirk et al. | |
| 2021/0267450 A1* | 9/2021 | Sharma | H04N 23/55 |
| 2021/0338484 A1 | 11/2021 | Hipsley | |
| 2022/0113459 A1* | 4/2022 | Lee | B05D 5/06 |
| 2023/0244077 A1* | 8/2023 | Kollin | G02B 27/0172 |
| | | | 359/630 |

OTHER PUBLICATIONS

Huang M.X., et al., "ScreenGlint: Practical, In-situ Gaze Estimation on Smartphones," Proceedings of the 2017 CHI Conference on Human Factors in Computing Systems, May 2017, pp. 2546-2557.

\* cited by examiner

POLARIZATION VOLUME HOLOGRAM COMBINER ENABLING WIDE POPULATION COVERAGE, EYE TRACKING ACCURACY, AND GLINT GENERATION

CROSS-REFERENCE TO RELATED APPLICATIONS

This application claims priority benefit of the United States Provisional Patent Application titled, "POLARIZATION VOLUME HOLOGRAM COMBINER ENABLING WIDE POPULATION COVERAGE, EYE TRACKING ACCURACY, AND GLINT GENERATION," filed on Aug. 3, 2022 and having Ser. No. 63/394,864. The subject matter of this related application is hereby incorporated herein by reference.

BACKGROUND

Field of the Various Embodiments

The present disclosure relates generally to eye-tracking systems, and more specifically, to a polarization volume hologram combiner enabling wide population coverage, eye tracking accuracy, and glint generation.

Description of Related Art

Artificial reality systems display content that may include completely generated content or generated content combined with captured (e.g., real-world) content. For example, a near eye display (NED) can implement an artificial reality system.

To produce a desired 3D effect, an artificial reality system needs to project left- and right-eye images in the correct directions towards the left and right eyes of a user, respectively. One conventional system for tracking the eyes of a user illuminates each eye using one or more illumination sources and directs light that is reflected from the eye towards an imaging device using a diffractive optical element that acts as a combiner. Based on images captured by the imaging device, the eye tracking system generates and analyzes tracking data related to the eye of the user.

One drawback of the above eye tracking system is that conventional combiners have limited angular bandwidth. For users with relatively high prescriptions, light that is reflected from an eye and that passes through a high-prescription lens can be incident on a combiner at an angle for which the combiner does not operate efficiently to direct light towards an imaging device. As a result, the imaging device cannot capture the images necessary for eye tracking.

Another drawback of the above eye tracking system is that physical and/or environmental stresses can cause the combiner and the imaging device to move relative to each other. For example, a NED can experience physical stresses when being worn on the head of a user, causing components of the NED, including the combiner and the imaging device, to tilt, bend, or otherwise move relative to one another. As a general matter, eye tracking can be inaccurate when such tilting, bending, or other movements of components of the NED are not accounted for.

Another drawback of the above eye tracking system is that, when conventional illumination source(s) are used to illuminate an eye with glints for eye tracking purposes, the illumination source(s) are oftentimes relatively large in size which can, in turn, increase the size of an artificial reality system. In addition, conventional illumination source(s) oftentimes create unwanted artifacts that are visible to the user and bystanders.

As the foregoing illustrates, what is needed in the art are more effective techniques for eye tracking in an artificial reality system.

SUMMARY

One embodiment of the present disclosure sets forth an eye tracking system. The eye tracking system includes one or more illumination sources. The eye tracking system further includes one or more imaging devices. In addition, the eye tracking system includes a polarization volume hologram (PVH) combiner that includes a liquid crystal (LC) layer having a non-uniform chiral concentration across a surface of the PVH combiner.

Another embodiment of the present disclosure sets forth an eye tracking system. The eye tracking system includes one or more illumination sources. The eye tracking system further includes one or more imaging devices. In addition, the eye tracking system includes a PVH combiner that includes at least one of (i) a first plurality of regions that diffract light from an eye at angles corresponding to different perspectives, or (ii) a second plurality of regions that diffract light away from the one or more imaging devices.

Another embodiment of the present disclosure sets forth an eye tracking system. The eye tracking system includes one or more illumination sources. The eye tracking system further includes one or more imaging devices. In addition, the eye tracking system includes a PVH combiner that includes a plurality of regions. Each region included in the plurality of regions diffracts light from the one or more illumination sources to form a glint on an eye.

One advantage of the eye tracking systems disclosed herein relative to the prior art is that a PVH combiner with rolling k-vectors can be used in conjunction with lenses that have relatively high prescriptions. Further, a PVH combiner that includes fiducial regions and/or is segmented into regions having different diffraction directions can be used to calibrate an eye tracking system, thereby improving eye tracking accuracy. In addition, using regions of a PVH combiner as virtual illumination sources to generate glints for eye tracking eliminates the need for physical illumination sources that are oftentimes relatively large in size and can create unwanted artifacts that are visible to a user and bystanders. These technical advantages represent one or more technological advancements over prior art approaches

BRIEF DESCRIPTION OF THE DRAWINGS

So that the manner in which the above recited features of the various embodiments can be understood in detail, a more particular description of the disclosed concepts, briefly summarized above, may be had by reference to various embodiments, some of which are illustrated in the appended drawings. It is to be noted, however, that the appended drawings illustrate only typical embodiments of the disclosed concepts and are therefore not to be considered limiting of scope in any way, and that there are other equally effective embodiments.

DETAILED DESCRIPTION

In the following description, numerous specific details are set forth to provide a more thorough understanding of the various embodiments. However, it is apparent to one of skill in the art that the disclosed concepts may be practiced without one or more of these specific details.

Configuration Overview

One or more embodiments disclosed herein relate to eye tracking systems. In some embodiments, an eye tracking system includes a polarization volume hologram (PVH) combiner having a rolling k-vector design that provides relatively wide coverage of users whose eyeglasses prescriptions can vary. The PVH combiner can further include (1) fiducial regions created by differential patterning that generate dark regions in images captured of an eye, and/or (2) multiple regions that diffract light at angles to produce different perspectives in the captured images. The dark regions and/or different perspectives can be used to calibrate eye tracking. In addition, the PVH combiner can include off-axis lens regions that generate glints for the eye tracking.

Embodiments of the disclosure may also include or be implemented in conjunction with an artificial reality system. Artificial reality is a form of reality that has been adjusted in some manner before presentation to a user, which may include, for example, a virtual reality (VR) system, an augmented reality (AR) system, a mixed reality (MR) system, a hybrid reality system, or some combination and/or derivatives thereof. Artificial reality content may include, without limitation, completely generated content or generated content combined with captured (e.g., real-world) content. The artificial reality content may include, without limitation, video, audio, haptic feedback, or some combination thereof. The artificial reality content may be presented in a single channel or in multiple channels (such as stereo video that produces a three-dimensional effect to the viewer). Additionally, in some embodiments, artificial reality systems may also be associated with applications, products, accessories, services, or some combination thereof, that are used to, e.g., create content in an artificial reality system and/or are otherwise used in (e.g., perform activities in) an artificial reality system. The artificial reality system may be implemented on various platforms, including a head-mounted display (HMD) connected to a host computer system, a standalone HMD, a mobile device or computing system, or any other hardware platform capable of providing artificial reality content to one or more viewers.

System Overview

Figure 1A:
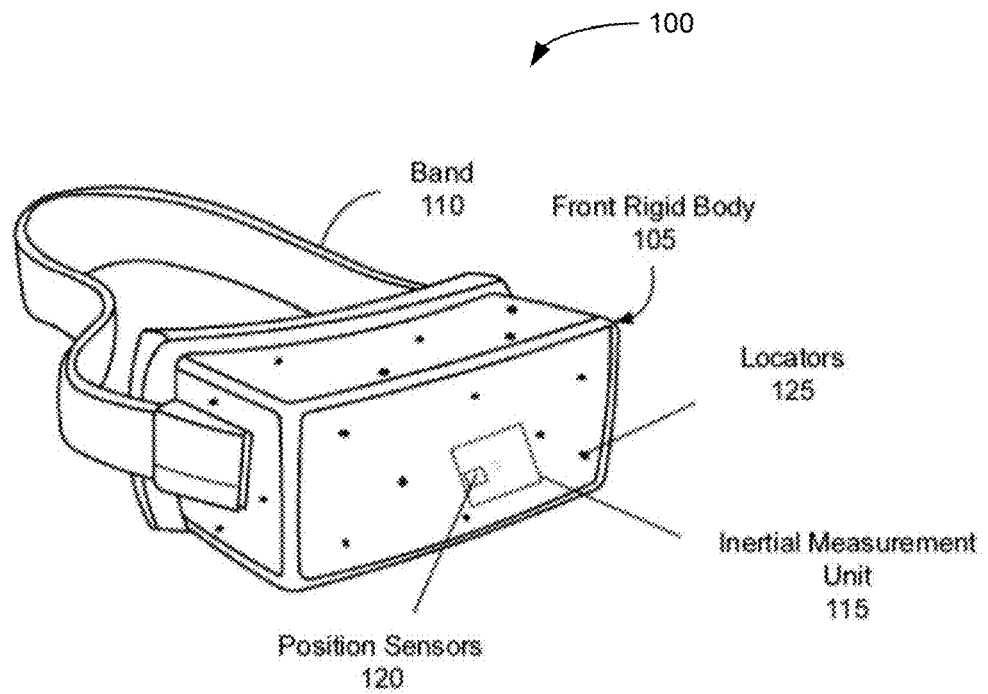
FIG. 1A is a diagram of a near eye display, according to various embodiments.

FIG. 1A is a wire diagram of a near eye display (NED) 100, according to various embodiments. As shown, the NED 100 includes a front rigid body 105 and a band 110. The front rigid body 105 includes one or more electronic display elements of an electronic display (not shown), an inertial measurement unit (IMU) 115, one or more position sensors 120, and locators 125. As illustrated in FIG. 1A, position sensors 120 are located within the IMU 115, and neither the IMU 115 nor the position sensors 120 are visible to the user. In various embodiments, where the NED 100 acts as an augmented reality (AR) or mixed reality (MR) device, portions of the NED 100 and/or its internal components are at least partially transparent.

Figure 1B:
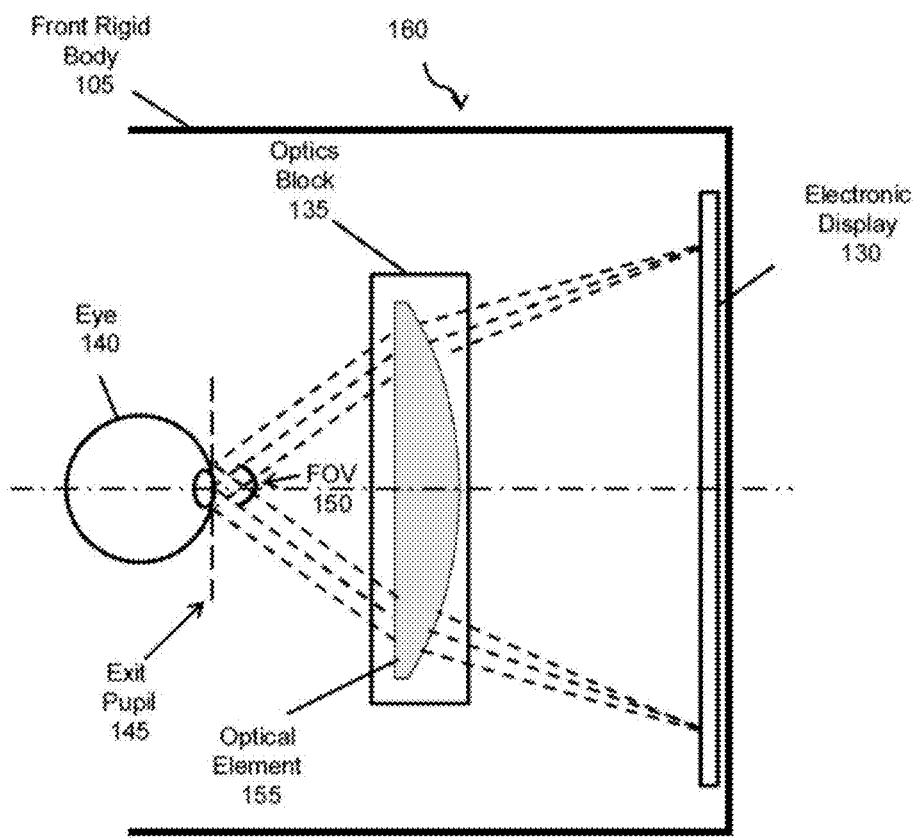
FIG. 1B is a cross section of the front rigid body of the embodiments of the near eye display illustrated in FIG. 1A.

FIG. 1B is a cross section 160 of the front rigid body 105 of the embodiments of the NED 100 illustrated in FIG. 1A. As shown, the front rigid body 105 includes an electronic display 130 and an optics block 135 that together provide image light to an exit pupil 145. The exit pupil 145 is the location of the front rigid body 105 where a user's eye 140 may be positioned. For purposes of illustration, FIG. 1B shows a cross section 160 associated with a single eye 140, but another optics block, separate from the optics block 135, may provide altered image light to another eye of the user. Additionally, the NED 100 includes an eye tracking system (not shown in FIG. 1B). The eye tracking system may include one or more sources that illuminate one or both eyes of the user. The eye tracking system may also include one or more cameras that capture images of one or both eyes of the user to track the positions of the eyes.

The electronic display 130 displays images to the user. In various embodiments, the electronic display 130 may comprise a single electronic display or multiple electronic displays (e.g., a display for each eye of a user). Examples of the electronic display 130 include: a liquid crystal display (LCD), an organic light emitting diode (OLED) display, an active-matrix organic light-emitting diode display (AMOLED), a QOLED, a QLED, some other display, or some combination thereof.

The optics block 135 adjusts an orientation of image light emitted from the electronic display 130 such that the electronic display 130 appears at particular virtual image distances from the user. The optics block 135 is configured to receive image light emitted from the electronic display 130 and direct the image light to an eye-box associated with the exit pupil 145. The image light directed to the eye-box forms an image at a retina of eye 140. The eye-box is a region defining how much the eye 140 moves up/down/left/right from without significant degradation in the image quality. In the illustration of FIG. 1B, a field of view (FOV) 150 is the extent of the observable world that is seen by the eye 140 at any given moment.

Additionally, in some embodiments, the optics block 135 magnifies received light, corrects optical errors associated with the image light, and presents the corrected image light to the eye 140. The optics block 135 may include one or more optical elements 155 in optical series. An optical element 155 may be an aperture, a Fresnel lens, a convex lens, a concave lens, a filter, a waveguide, a Pancharatnam-Berry phase (PBP) lens or grating, a color-selective filter, a waveplate, a C-plate, or any other suitable optical element 155 that affects the image light. Moreover, the optics block 135 may include combinations of different optical elements. One or more of the optical elements in the optics block 135 may have one or more coatings, such as anti-reflective coatings.

Figure 2A:
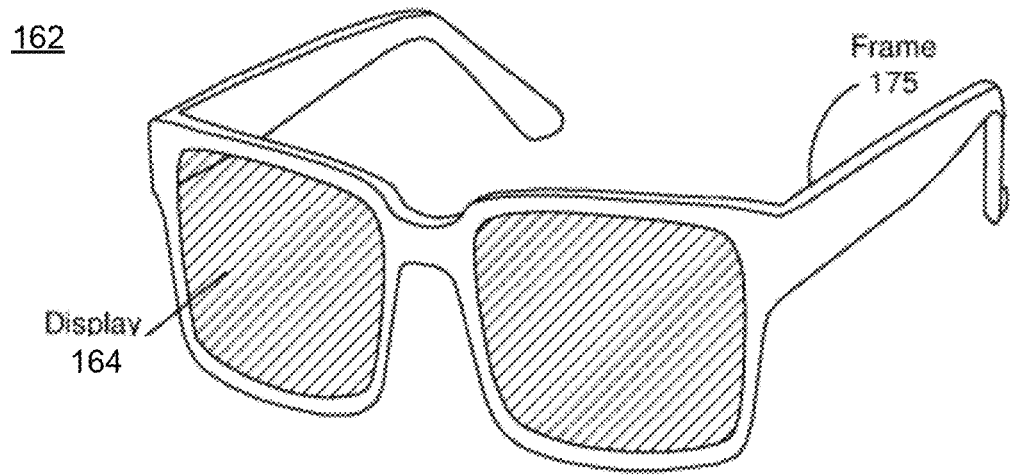
FIG. 2A is a diagram of a head-mounted display implemented as a near eye display, according to various embodiments.

FIG. 2A is a diagram of an HMD 162 implemented as a NED, according to various embodiments. As shown, the HMD 162 is in the form of a pair of augmented reality glasses. The HMD 162 presents computer-generated media to a user and augments views of a physical, real-world environment with the computer-generated media. Examples of computer-generated media presented by the HMD 162 include one or more images, video, audio, or some combination thereof. In some embodiments, audio is presented via an external device (e.g., speakers and headphones) that receives audio information from the HMD 162, a console (not shown), or both, and presents audio data based on audio information. In some embodiments, the HMD 162 may be modified to also operate as a virtual reality (VR) HMD, a MR HMD, or some combination thereof. The HMD 162 includes a frame 175 and a display 164. As shown, the frame 175 mounts the NED to the user's head, while the display 164 provides image light to the user. The display 164 may be customized to a variety of shapes and sizes to conform to different styles of eyeglass frames.

Figure 2B:
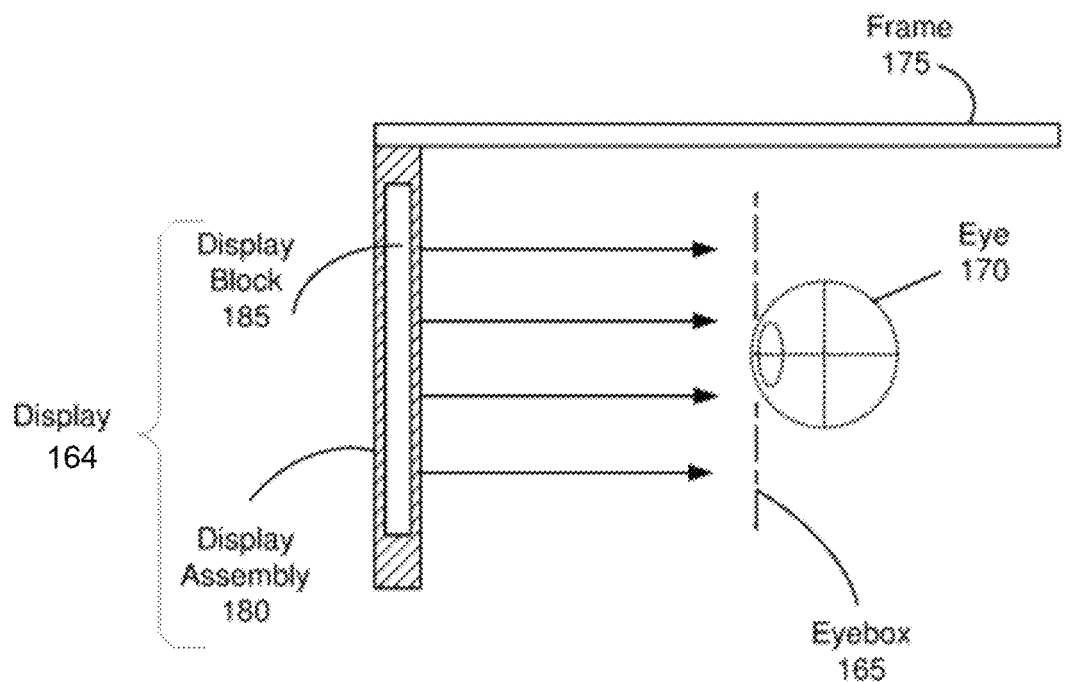
FIG. 2B is a cross-section view of the head-mounted display of FIG. 2A implemented as a near eye display, according to various embodiments.

FIG. 2B is a cross-section view of the HMD 162 of FIG. 2A implemented as a NED, according to various embodiments. This view includes frame 175, display 164 (which comprises a display assembly 180 and a display block 185), and eye 170. The display assembly 180 supplies image light to the eye 170. The display assembly 180 houses display block 185, which, in different embodiments, encloses the different types of imaging optics and redirection structures. For purposes of illustration, FIG. 2B shows the cross section associated with a single display block 185 and a single eye 170, but in alternative embodiments not shown, another display block, which is separate from display block 185 shown in FIG. 2B, provides image light to another eye of the user.

The display block 185, as illustrated, is configured to combine light from a local area with light from a computer-generated image to form an augmented scene. The display block 185 is also configured to provide the augmented scene to the eyebox 165 corresponding to a location of the user's eye 170. The display block 185 may include, for example, a waveguide display, a focusing assembly, a compensation assembly, or some combination thereof.

HMD 162 may include one or more other optical elements between the display block 185 and the eye 170. The optical elements may act to, for example, correct aberrations in image light emitted from the display block 185, magnify image light emitted from the display block 185, some other optical adjustment of image light emitted from the display block 185, or some combination thereof. The example for optical elements may include an aperture, a Fresnel lens, a convex lens, a concave lens, a filter, or any other suitable optical element that affects image light. The display block 185 may also comprise one or more materials (e.g., plastic, glass, etc.) with one or more refractive indices that effectively minimize the weight and widen a field of view of the HMD 162.

Figure 3:
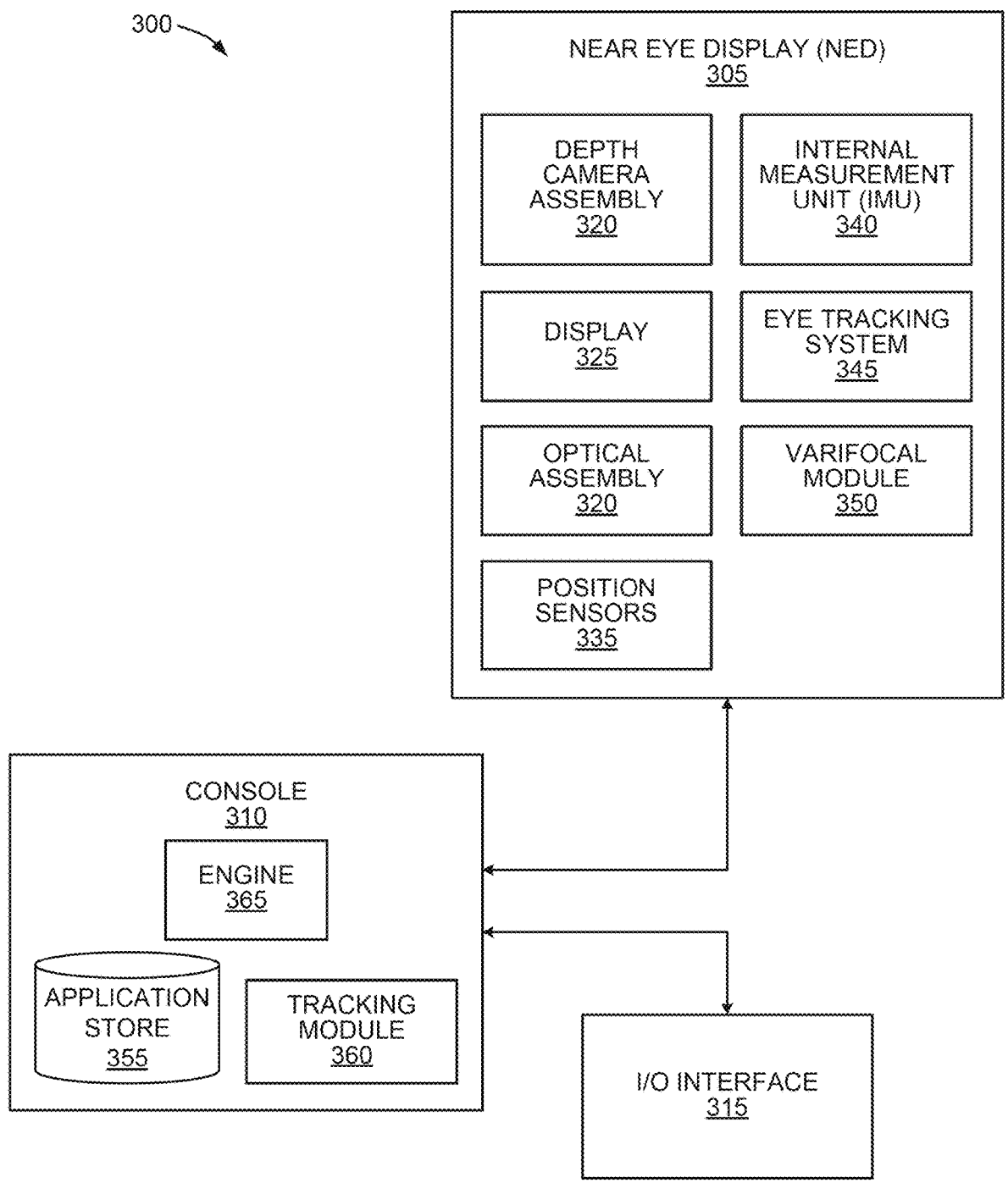
FIG. 3 is a block diagram of a near eye display system, according to various embodiments.

FIG. 3 is a block diagram of an embodiment of a near eye display system 300 in which a console 310 operates. In some embodiments, the NED system 300 corresponds to the NED 100 or the HMD 162. The NED system 300 may operate in a VR system environment, an AR system environment, a MR system environment, or some combination thereof. The NED system 300 shown in FIG. 3 comprises a NED 305 and an input/output (I/O) interface 315 that is coupled to the console 310.

While FIG. 3 shows an example NED system 300 including one NED 305 and one I/O interface 315, in other embodiments any number of these components may be included in the NED system 300. For example, there may be multiple NEDs 305 that each has an associated I/O interface 315, where each NED 305 and I/O interface 315 communicates with the console 310. In alternative configurations, different and/or additional components may be included in the NED system 300. Additionally, various components included within the NED 305, the console 310, and the I/O interface 315 may be distributed in a different manner than is described in conjunction with FIG. 3 in some embodiments. For example, some or all of the functionality of the console 310 may be provided by the NED 305.

The NED 305 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 305 may also present audio content to a user. The NED 305 and/or the console 310 may transmit the audio content to an external device via the I/O interface 315. The external device may include various forms of speaker systems and/or headphones. In various embodiments, the audio content is synchronized with visual content being displayed by the NED 305.

The NED 305 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 3, the NED 305 may include a depth camera assembly (DCA) 320, a display 325, an optical assembly 330, one or more position sensors 335, an inertial measurement unit (IMU) 340, an eye tracking system 345, and a varifocal module 350. In some embodiments, the display 325 and the optical assembly 330 can be integrated together into a projection assembly. Various embodiments of the NED 305 may have additional, fewer, or different components than those listed above. Additionally, the functionality of each component may be partially or completely encompassed by the functionality of one or more other components in various embodiments.

The DCA 320 captures sensor data describing depth information of an area surrounding the NED 305. The sensor data may be generated by one or a combination of depth imaging techniques, such as triangulation, structured light imaging, time-of-flight imaging, laser scan, and so forth. The DCA 320 can compute various depth properties of the area surrounding the NED 305 using the sensor data. Additionally or alternatively, the DCA 320 may transmit the sensor data to the console 310 for processing.

The DCA 320 includes an illumination source, an imaging device, and a controller. The illumination source emits light onto an area surrounding the NED 305. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light in the environment surrounding NED 305, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The display 325 displays two-dimensional or three-dimensional images to the user in accordance with pixel data received from the console 310. In various embodiments, the display 325 comprises a single display or multiple displays (e.g., separate displays for each eye of a user). In some embodiments, the display 325 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the display types may be incorporated in display 325 and used separately, in parallel, and/or in combination.

The optical assembly 330 magnifies image light received from the display 325, corrects optical errors associated with the image light, and presents the corrected image light to a user of the NED 305. The optical assembly 330 includes a plurality of optical elements. For example, one or more of the following optical elements may be included in the optical assembly 330: an aperture, a Fresnel lens, a convex lens, a concave lens, a filter, a reflecting surface, or any other suitable optical element that deflects, reflects, refracts, and/or in some way alters image light. Moreover, the optical assembly 330 may include combinations of different optical elements. In some embodiments, one or more of the optical elements in the optical assembly 330 may have one or more coatings, such as partially reflective or antireflective coatings. The optical assembly 330 can be integrated into a projection assembly, e.g., a projection assembly. In one embodiment, the optical assembly 330 includes the optics block 155.

In operation, the optical assembly 330 magnifies and focuses image light generated by the display 325. In so doing, the optical assembly 330 enables the display 325 to be physically smaller, weigh less, and consume less power than displays that do not use the optical assembly 330. Additionally, magnification may increase the field of view of the content presented by the display 325. For example, in some embodiments, the field of view of the displayed content partially or completely uses a user's field of view. For example, the field of view of a displayed image may meet or exceed 310 degrees. In various embodiments, the amount of magnification may be adjusted by adding or removing optical elements.

In some embodiments, the optical assembly 330 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 325 is pre-distorted, and the optical assembly 330 corrects the distortion as image light from the display 325 passes through various optical elements of the optical assembly 330. In some embodiments, optical elements of the optical assembly 330 are integrated into the display 325 as a projection assembly that includes at least one waveguide coupled with one or more optical elements.

The IMU 340 is an electronic device that generates data indicating a position of the NED 305 based on measurement signals received from one or more of the position sensors 335 and from depth information received from the DCA 320. In some embodiments of the NED 305, the IMU 340 may be a dedicated hardware component. In other embodiments, the IMU 340 may be a software component implemented in one or more processors.

In operation, a position sensor 335 generates one or more measurement signals in response to a motion of the NED 305. Examples of position sensors 335 include: one or more accelerometers, one or more gyroscopes, one or more magnetometers, one or more altimeters, one or more inclinometers, and/or various types of sensors for motion detection, drift detection, and/or error detection. The position sensors 335 may be located external to the IMU 340, internal to the IMU 340, or some combination thereof.

Based on the one or more measurement signals from one or more position sensors 335, the IMU 340 generates data indicating an estimated current position of the NED 305 relative to an initial position of the NED 305. For example, the position sensors 335 may include multiple accelerometers to measure translational motion (forward/back, up/down, left/right) and multiple gyroscopes to measure rotational motion (e.g., pitch, yaw, and roll). In some embodiments, the IMU 340 rapidly samples the measurement signals and calculates the estimated current position of the NED 305 from the sampled data. For example, the IMU 340 may integrate the measurement signals received from the accelerometers over time to estimate a velocity vector and integrate the velocity vector over time to determine an estimated current position of a reference point on the NED 305. Alternatively, the IMU 340 provides the sampled measurement signals to the console 310, which analyzes the sample data to determine one or more measurement errors.

The console 310 may further transmit one or more of control signals and/or measurement errors to the IMU 340 to configure the IMU 340 to correct and/or reduce one or more measurement errors (e.g., drift errors). The reference point is a point that may be used to describe the position of the NED 305. The reference point may generally be defined as a point in space or a position related to a position and/or orientation of the NED 305.

In various embodiments, the IMU 340 receives one or more parameters from the console 310. The one or more parameters are used to maintain tracking of the NED 305. Based on a received parameter, the IMU 340 may adjust one or more IMU parameters (e.g., a sample rate). In some embodiments, certain parameters cause the IMU 340 to update an initial position of the reference point so that it corresponds to a next position of the reference point. Updating the initial position of the reference point as the next calibrated position of the reference point helps reduce drift errors in detecting a current position estimate of the IMU 340.

In some embodiments, the eye tracking system 345 is integrated into the NED 305. The eye-tracking system 345 may comprise one or more illumination sources and an imaging device (camera). In operation, the eye tracking system 345 generates and analyzes tracking data related to a user's eyes as the user wears the NED 305. The eye tracking system 345 may further generate eye tracking information that may comprise information about a position of the user's eye, i.e., information about an angle of an eye-gaze.

In some embodiments, the varifocal module 350 is further integrated into the NED 305. The varifocal module 350 may be communicatively coupled to the eye tracking system 345 in order to enable the varifocal module 350 to receive eye tracking information from the eye tracking system 345. The varifocal module 350 may further modify the focus of image light emitted from the display 325 based on the eye tracking information received from the eye tracking system 345. Accordingly, the varifocal module 350 can reduce vergence-accommodation conflict that may be produced as the user's eyes resolve the image light. In various embodiments, the varifocal module 350 can be interfaced (e.g., either mechanically or electrically) with at least one optical element of the optical assembly 330.

In operation, the varifocal module 350 may adjust the position and/or orientation of one or more optical elements in the optical assembly 330 in order to adjust the focus of image light propagating through the optical assembly 330. In various embodiments, the varifocal module 350 may use eye tracking information obtained from the eye tracking system 345 to determine how to adjust one or more optical elements in the optical assembly 330. In some embodiments, the varifocal module 350 may perform foveated rendering of the image light based on the eye tracking information obtained from the eye tracking system 345 in order to adjust the resolution of the image light emitted by the display 325. In this case, the varifocal module 350 configures the display 325 to display a high pixel density in a foveal region of the user's eye-gaze and a low pixel density in other regions of the user's eye-gaze.

The I/O interface 315 facilitates the transfer of action requests from a user to the console 310. In addition, the I/O interface 315 facilitates the transfer of device feedback from the console 310 to the user. An action request is a request to perform a particular action. For example, an action request may be an instruction to start or end capture of image or video data or an instruction to perform a particular action within an application, such as pausing video playback, increasing or decreasing the volume of audio playback, and so forth. In various embodiments, the I/O interface 315 may include one or more input devices. Example input devices include: a keyboard, a mouse, a game controller, a joystick, and/or any other suitable device for receiving action requests and communicating the action requests to the console 310. In some embodiments, the I/O interface 315 includes an IMU 340 that captures calibration data indicating an estimated current position of the I/O interface 315 relative to an initial position of the I/O interface 315.

In operation, the I/O interface 315 receives action requests from the user and transmits those action requests to the console 310. Responsive to receiving the action request, the console 310 performs a corresponding action. For example, responsive to receiving an action request, the console 310 may configure the I/O interface 315 to emit haptic feedback onto an arm of the user. For example, the console 315 may configure the I/O interface 315 to deliver haptic feedback to a user when an action request is received. Additionally or alternatively, the console 310 may configure the I/O interface 315 to generate haptic feedback when the console 310 performs an action, responsive to receiving an action request.

The console 310 provides content to the NED 305 for processing in accordance with information received from one or more of: the DCA 320, the NED 305, and the I/O interface 315. As shown in FIG. 3, the console 310 includes an application store 355, a tracking module 360, and an engine 365. In some embodiments, the console 310 may have additional, fewer, or different modules and/or components than those described in conjunction with FIG. 3. Similarly, the functions further described below may be distributed among components of the console 310 in a different manner than described in conjunction with FIG. 3.

The application store 355 stores one or more applications for execution by the console 310. An application is a group of instructions that, when executed by a processor, performs a particular set of functions, such as generating content for presentation to the user. For example, an application may generate content in response to receiving inputs from a user (e.g., via movement of the NED 305 as the user moves his/her head, via the I/O interface 315, etc.). Examples of applications include: gaming applications, conferencing applications, video playback applications, or other suitable applications.

The tracking module 360 calibrates the NED system 300 using one or more calibration parameters. The tracking module 360 may further adjust one or more calibration parameters to reduce error in determining a position and/or orientation of the NED 305 or the I/O interface 315. For example, the tracking module 360 may transmit a calibration parameter to the DCA 320 in order to adjust the focus of the DCA 320. Accordingly, the DCA 320 may more accurately determine positions of structured light elements reflecting off of objects in the environment. The tracking module 360 may also analyze sensor data generated by the IMU 340 in determining various calibration parameters to modify. Further, in some embodiments, if the NED 305 loses tracking of the user's eye, then the tracking module 360 may re-calibrate some or all of the components in the NED system 300. For example, if the DCA 320 loses line of sight of at least a threshold number of structured light elements projected onto the user's eye, the tracking module 360 may transmit calibration parameters to the varifocal module 350 in order to re-establish eye tracking.

The tracking module 360 tracks the movements of the NED 305 and/or of the I/O interface 315 using information from the DCA 320, the one or more position sensors 335, the IMU 340 or some combination thereof. For example, the tracking module 360 may determine a reference position of the NED 305 from a mapping of an area local to the NED 305. The tracking module 360 may generate this mapping based on information received from the NED 305 itself. The tracking module 360 may also utilize sensor data from the IMU 340 and/or depth data from the DCA 320 to determine reference positions for the NED 305 and/or I/O interface 315. In various embodiments, the tracking module 360 generates an estimation and/or prediction for a subsequent position of the NED 305 and/or the I/O interface 315. The tracking module 360 may transmit the predicted subsequent position to the engine 365.

The engine 365 generates a three-dimensional mapping of the area surrounding the NED 305 (i.e., the "local area") based on information received from the NED 305. In some embodiments, the engine 365 determines depth information for the three-dimensional mapping of the local area based on depth data received from the DCA 320 (e.g., depth information of objects in the local area). In some embodiments, the engine 365 calculates a depth and/or position of the NED 305 by using depth data generated by the DCA 320. In particular, the engine 365 may implement various techniques for calculating the depth and/or position of the NED 305, such as stereo based techniques, structured light illumination techniques, time-of-flight techniques, and so forth. In various embodiments, the engine 365 uses depth data received from the DCA 320 to update a model of the local area and to generate and/or modify media content based in part on the updated model.

The engine 365 also executes applications within the NED system 300 and receives position information, acceleration information, velocity information, predicted future positions, or some combination thereof, of the NED 305 from the tracking module 360. Based on the received information, the engine 365 determines various forms of media content to transmit to the NED 305 for presentation to the user. For example, if the received information indicates that the user has looked to the left, the engine 365 generates media content for the NED 305 that mirrors the user's movement in a virtual environment or in an environment augmenting the local area with additional media content. Accordingly, the engine 365 may generate and/or modify media content (e.g., visual and/or audio content) for presentation to the user. The engine 365 may further transmit the media content to the NED 305. Additionally, in response to receiving an action request from the I/O interface 315, the engine 365 may perform an action within an application executing on the console 310. The engine 305 may further provide feedback when the action is performed. For example, the engine 365 may configure the NED 305 to generate visual and/or audio feedback and/or the I/O interface 315 to generate haptic feedback to the user.

Polarization Volume Hologram Combiner Providing Wide Population Coverage

Figure 4:
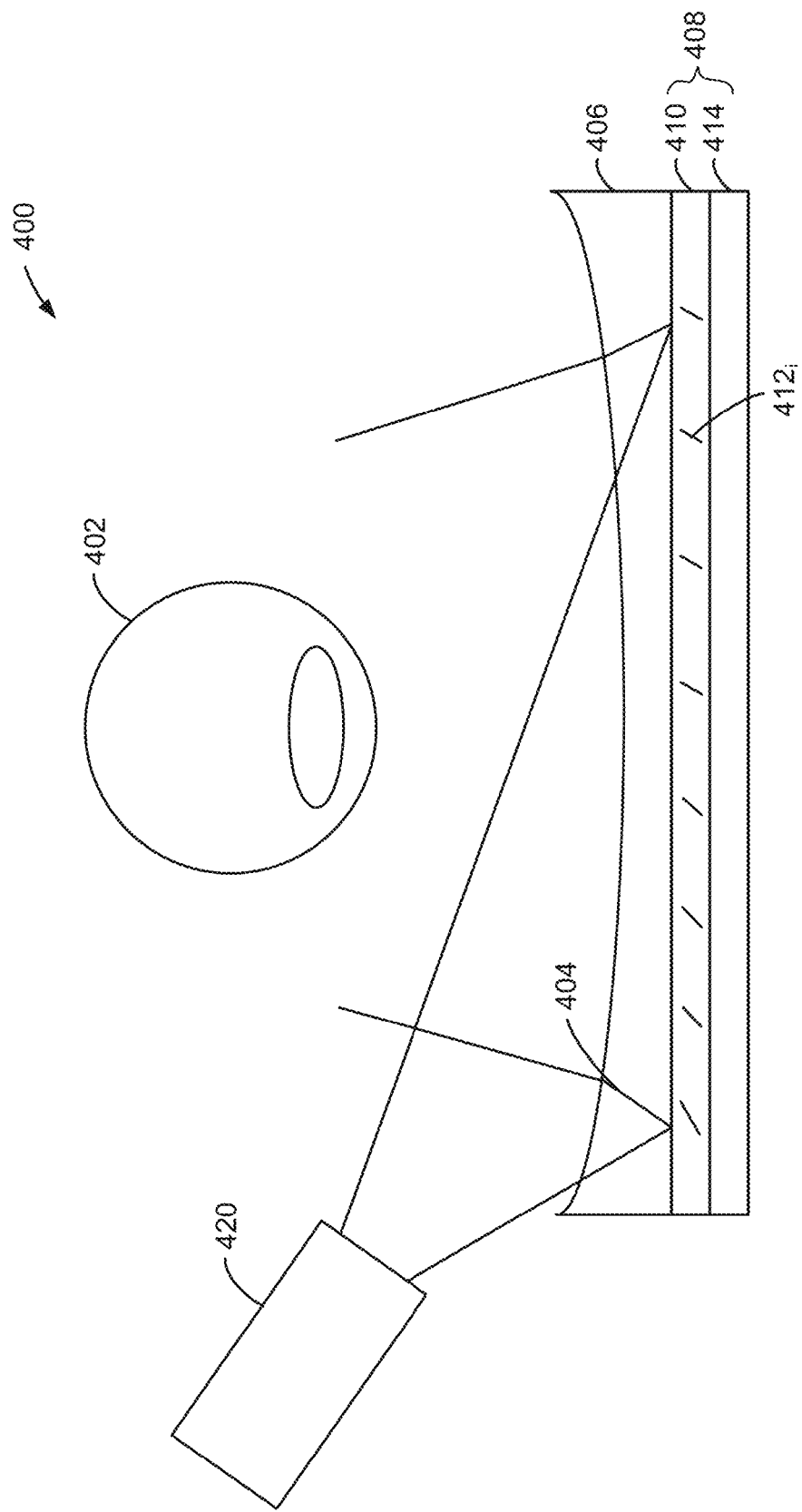
FIG. 4 illustrates a cross-section view of an eye tracking system including an exemplar polarization volume hologram (PVH) combiner that provides wide population coverage, according to various embodiments.

FIG. 4 illustrates a cross-section view of an eye tracking system 400 including an exemplar polarization volume hologram (PVH) combiner 408 that provides wide population coverage, according to various embodiments. The eye tracking system 400 can be included in an artificial reality system, such as the NED 100, the HMD 162, or the NED 300. As described, an artificial reality system needs to project left- and right-eye images in correct directions towards the left and right eyes of a user, respectively, in order to produce a desired 3D effect. An eye tracking system can track the eyes of a user by (1) using one or more illumination sources to illuminate each eye, and (2) using a diffractive optical element as a combiner to direct light that is reflected from the eye towards an imaging device, such as a camera. However, conventional combiners have limited angular bandwidth. For users with relatively high prescriptions, light that is reflected from an eye and that passes through a high-prescription lens can be incident on a conventional combiner at an angle for which the combiner does not operate efficiently to direct light towards an imaging device. In such cases, the imaging device cannot capture the images necessary for eye tracking.

As shown in FIG. 4, the eye tracking system 400 includes the PVH combiner 408 with k-vector rolling that directs light reflected from an eye 402 towards an imaging device 420. The eye tracking system can also include one or more illumination sources (not shown) that emit light towards the eye 402. The PVH combiner 408 with k-vector rolling is a diffractive optical element that selectively diffracts certain wavelengths of light. For example, in some embodiments, the PVH combiner 408 with k-vector rolling selectively diffracts infrared (IR) light that is emitted by one or more illumination sources, while allowing through other wavelengths of light, so that the user does not see the light source.

Light is diffracted by the PVH combiner in directions represented by k-vectors $412_i$ (referred to herein collectively as k-vectors 412 and individually as a k-vector 412). Rather than being associated with a constant k-vector, the k-vector 412 of the PVH combiner 408 varies across the PVH combiner 408, which is also referred to as k-vector rolling. As a general matter, the diffraction efficiency is different for different angles of incidence of light on a PVH combiner. The PVH combiner 408 with k-vector rolling is manufactured to aim the k-vector 412 in different regions of the PVH combiner 408 based on the angle of incidence of light in those regions, thereby increasing the diffraction efficiency for users with different prescriptions, including relatively high prescriptions. Illustratively, a high prescription lens 406 bends light 404 from the eye 402, causing the light at peripheral regions of the lens 406 to be incident on the PVH combiner 408 at large angles relative to light at other regions of the lens 406. The PVH combiner 408 with k-vector rolling can diffract the light incident at large angles relatively efficiently, in contrast to conventional combiners that are associated with constant k-vectors and do not efficiently diffract light incident at large angles.

In some embodiments, how the k-vector is aimed in different regions of a PVH combiner with k-vector rolling generally depends on the design of the artificial reality system, including the locations and orientations of the imaging device and the PVH combiner relative to each other. In some embodiments, k-vector rolling is used to expand the effective angular bandwidth of a PVH combiner such that the PVH combiner with k-vector rolling can diffract light that has passed through a lens having a prescription in the range of +5 to −15 diopters, or a smaller range therein, towards an imaging device. The exact range will generally depend on the imaging device angle and the grating angle, among other things.

Figure 5A:
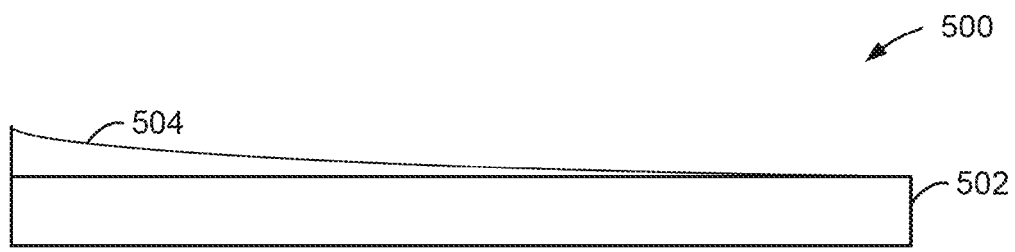
FIGS. 5A-5B illustrate an exemplar technique for printing a liquid crystal layer of a PVH combiner, according to various embodiments.
Figure 5B:
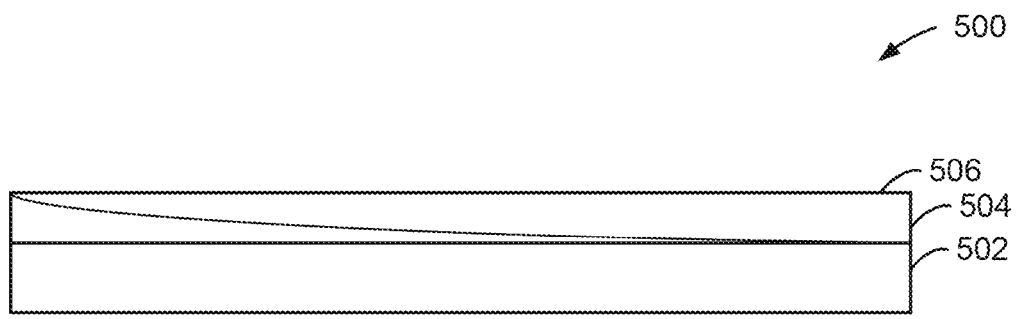

FIGS. 5A-5B illustrate an exemplar technique for printing a liquid crystal layer of a PVH combiner, according to various embodiments. As shown, a PVH combiner 500 with k-vector rolling can be manufactured by printing, on a clear substrate 502 such as glass, two liquid crystal (LC) layers 504 and 506 having different chiral concentrations. Each LC layer 504 and 506 is able to self-organize into a twisting structure and forms a grating, and the different chiral concentrations mean the two LC layers 504 and 506 have different rotating power when the LC layers 504 and 506 self-organize into gratings. As shown in FIG. 5A, the LC layer 504 is a high chiral concentration LC layer with relatively high rotating power that is printed according to a first pattern on top of the substrate 502. For example, inkjet printing or any other technically feasible technique can be employed to deposit the LC layer 504. As shown in FIG. 5B, after the high chiral concentration LC layer 504 is printed, the LC layer 506 is a low chiral concentration LC layer with a relatively low rotating power that is printed according to a second pattern on top of the high chiral concentration LC layer 504. The thickness of the high chiral concentration LC layer 504 and the thickness of the low chiral concentration LC 506 layer will differ in different regions of the PVH combiner 500 based on the first pattern and the second pattern, respectively.

Based on the thicknesses of the high chiral concentration LC layer 504 and the low chiral concentration LC 506 layer in different regions of the PVH combiner 500, after the high chiral concentration LC layer 504 and the low chiral concentration LC layer 506 mix into a single layer during the printing process, the resulting PVH combiner 500 will have different chiral concentrations, and therefore a differing k-vector, across a surface of the PVH combiner 500. That is, the patterning controls the k-vector variation across the PVH combiner, while the manufacturing process controls the material mixture. In particular, a z component of the k-vector, which is also referred herein as kz and is associated with the chiral concentrations of the pattern across the PVH combiner 500 and therefore the diffraction efficiency, can be modified using the above manufacturing process. After the LC layers 504 and 506 having different chiral concentrations are mixed into a single layer, the single layer can be polymerized into a dry film via a curing process, such as ultraviolet (UV) curing. In some embodiments, the above process can be repeated to produce multiple stacking layers of a PVH combiner.

In some embodiments, an x and a y component of the k-vector (also referred to herein as "kx" and "ky," respectively), which are associated with the periodicity of a pattern across the PVH combiner and the diffraction angle, can also be modified in any technically feasible manner, such as using a slot-die coating technique, an interference technique, or another known technique. Accordingly, the diffraction efficiency, controlled by kz, and diffraction angle, controlled by kx and ky, can be optimized in some embodiments to (1) increase the diffraction efficiency of the PVH combiner with k-vector rolling, which is affected predominantly by a kz that broadens the angles of incidence at which the PVH combiner is efficient, and (2) improve the image quality produced by the PVH combiner with k-vector rolling, which is affected predominantly by kx and ky.

Figure 6:
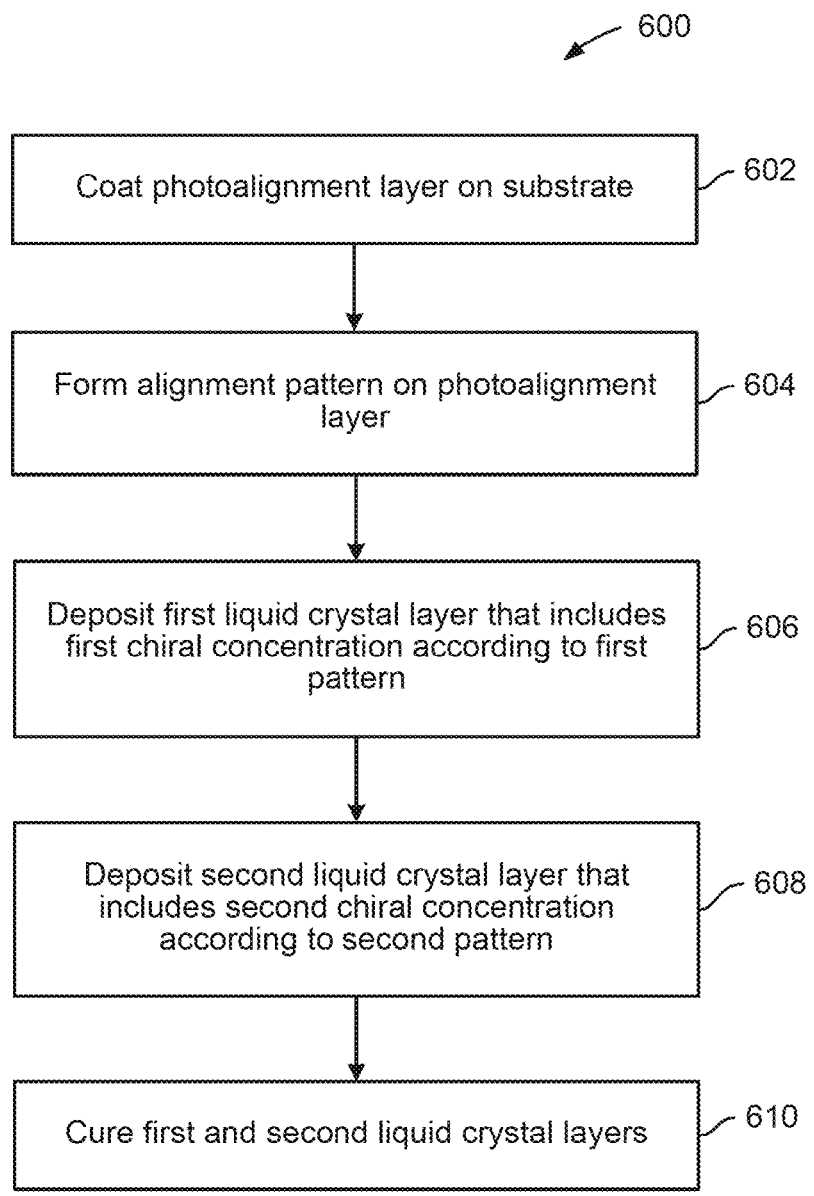
FIG. 6 illustrates a method for manufacturing a PVH combiner, according to various embodiments.

FIG. 6 illustrates a method 600 for manufacturing a PVH combiner, according to various embodiments. As shown, the method 600 begins at step 602, where a photoalignment layer is coated on a substrate (e.g., substrate 412). The photoalignment layer can be formed from any material suitable for photoalignment of LC materials.

At step 604, an alignment pattern is formed on the photoalignment layer. The alignment pattern controls kx and ky of the k-vector of the PVH combiner being manufactured. As described, kx and ky are associated with the periodicity of a pattern across the PVH combiner and the diffraction angle. The alignment pattern can be formed in any technically feasible manner in some embodiments, such as via an interference beam.

At step 606, a first LC layer that includes a first chiral concentration is deposited on the photoalignment layer according to a first pattern. For example, a high chiral concentration LC layer with a relatively high rotating power can be printed as according to the first pattern in a first layer at step 606.

At step 608, a second LC layer that includes a second chiral concentration that is different from the first chiral concentration of the first LC layer is deposited on top of the first LC layer according to a second pattern. For example, a low chiral concentration LC layer with a relatively low rotating power can be printed according to the second pattern on top of the first layer. The printing of the LC layers defines the kz of the k-vector (with the kx and ky being defined by the alignment pattern described above in conjunction with step 604).

At step 610, the deposited first and second LC layers are cured. In some embodiments, the first and second LC layers mix into a single layer during the printing process, and the single layer is polymerized into a dry film via a curing process at step 610. Any technically feasible curing process, such as UV curing, can be performed in some embodiments. In some embodiments, the steps 602-610 can be repeated to produce multiple stacking layers of a PVH combiner.

Figure 7:
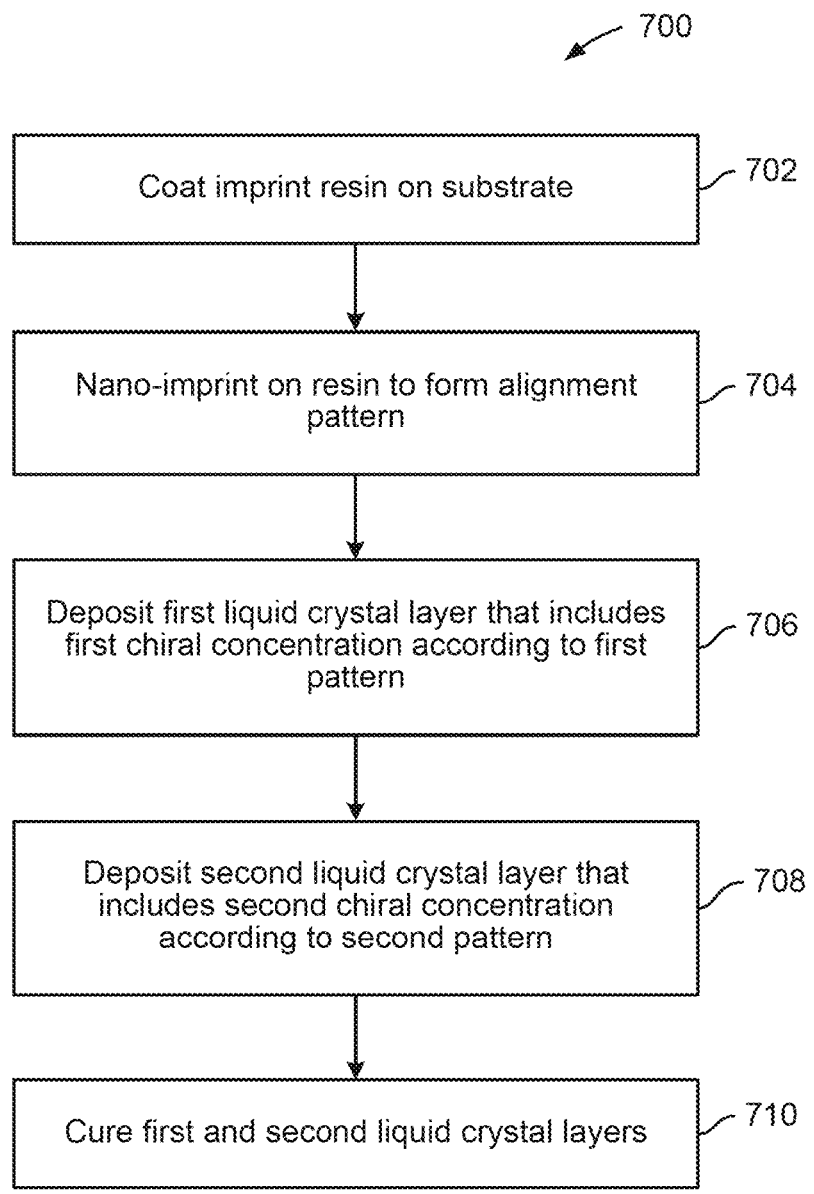
FIG. 7 illustrates a method for manufacturing a PVH combiner, according to various other embodiments.

FIG. 7 illustrates a method 700 for manufacturing a PVH combiner, according to various other embodiments. As shown, the method 700 begins at step 702, where an imprint resin is coated on a substrate (e.g., substrate 412). The resin can be formed from any material suitable for nano-imprinting.

At step 704, the resin is nano-imprinted to form an alignment pattern. The alignment pattern controls kx and ky of the k-vector of the PVH combiner being manufactured. The alignment pattern can be nano-imprinted in any technically feasible manner in some embodiments. For example, in some embodiments, an imprint mold is created by lithography and used to nano-imprint the alignment pattern. In such cases, the imprint mold can be designed to have wider or narrower grooves to produce kx and ky variation.

At step 706, a first LC layer that includes a first chiral concentration is deposited on the photoalignment layer according to a first pattern. Step 706 is similar to step 606 of the method 600, described above in conjunction with FIG. 6.

At step 708, a second LC layer that includes a second chiral concentration that is different from the first chiral concentration of the first LC layer is deposited on top of the first LC layer according to a second pattern. Step 708 is similar to step 608 of the method 600, described above in conjunction with FIG. 6.

At step 710, the deposited first and second LC layers are cured. In some embodiments, the first and second LC layers mix into a single layer during the printing process, and the single layer is cured at step 610. Step 710 is similar to step 610 of the method 600, described above in conjunction with FIG. 6. In some embodiments, steps 702-710 can be repeated to produce multiple stacking layers of a PVH combiner.

Figure 8A:
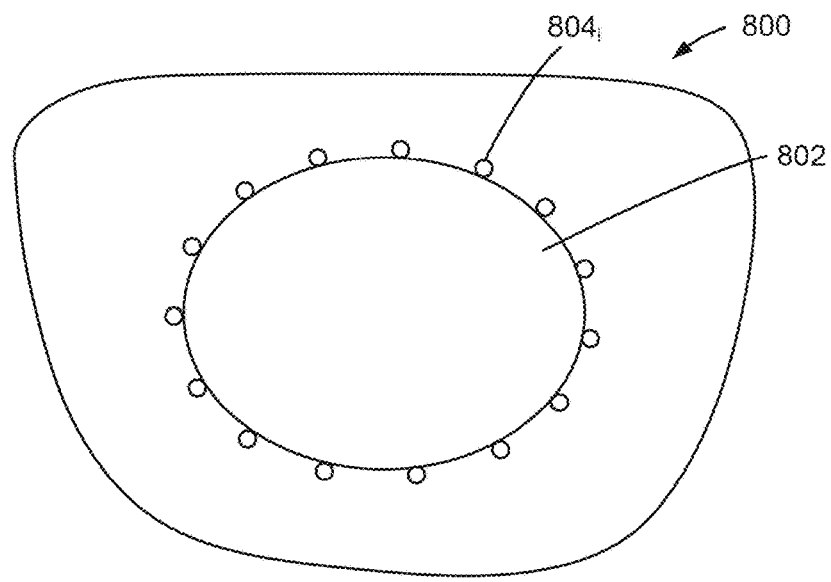
FIG. 8A illustrates an exemplar PVH combiner that includes fiducial regions, according to various embodiments.

Polarization Volume Hologram Combiner Including Fiducial Regions and Segmentation for Eye Tracking Calibration FIG. 8A illustrates an exemplar PVH combiner 800 that includes fiducial regions, according to various embodiments. The PVH combiner 800 can be included in an artificial reality system, such as the NED 100, the HMD 162, or the NED 300. As described, physical and/or environmental stresses can cause components of an artificial reality system to move relative to each other. Eye tracking using a diffractive optical element that acts as a combiner and an imaging device can be inaccurate when tilting, bending, and/or other movements of the components of an artificial reality system are not accounted for.

As shown in FIG. 8A, the PVH combiner 800 includes an imaging region 802 and multiple fiducial regions 804$_i$ (referred to herein collectively as fiducial regions 804 and individually as a fiducial region 804). The imaging region 802 is an active region that diffracts light from an eye towards an imaging device. The fiducial regions 804 include different LC patterning than the imaging region 802 and diffract light away from the imaging device. The fiducial regions 804 generate dark spots in captured images of the eye, which can be used during eye tracking calibration to construct a reference coordinate system that, among other things, relates where one or more illumination sources are relative to the eye.

Figure 9:
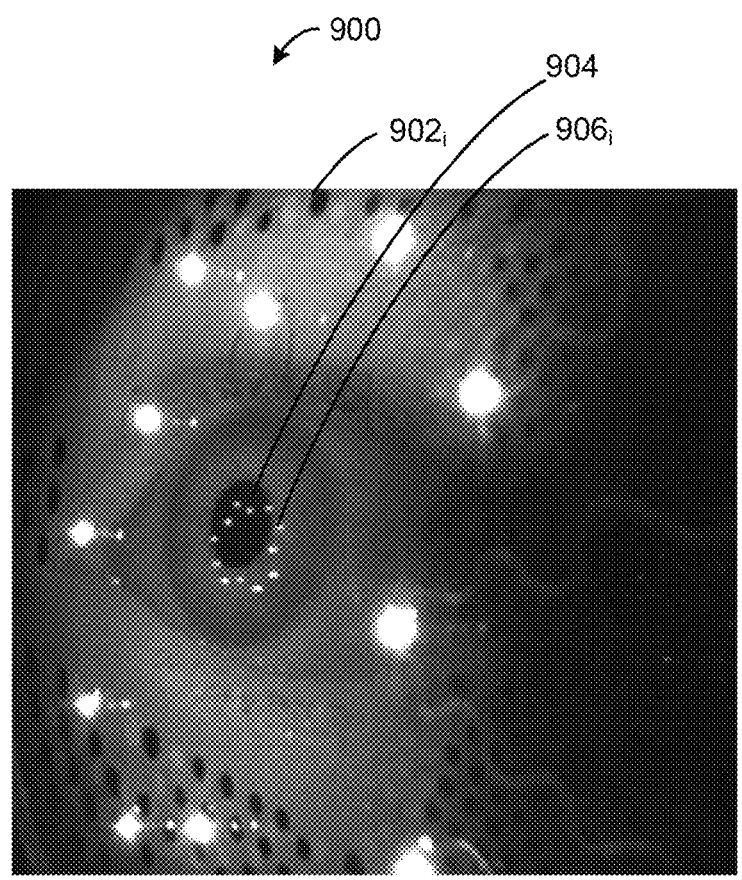
FIG. 9 illustrates an exemplar image that includes dark spots for eye tracking calibration, according to various embodiments.

FIG. 9 illustrates an exemplar image 900 of an eye that includes dark spots 902$_i$ (referred to herein collectively as dark spots 902 and individually as a dark spot 902) for eye tracking calibration, according to various embodiments. As shown, the image 900 also shows a pupil 904 of an eye and glints 906$_i$ (referred to herein collectively as glints 906 and individually as a glint 906) that can be used for eye tracking according to known techniques.

Returning to FIG. 8A, fiducial regions 804 that are circular in shape and form a ring around the imaging region 802 are shown for illustrative purposes. In some embodiments, fiducial regions of a PVH combiner can have any technically feasible shape and be at any suitable locations. Illustratively, the ring of fiducial regions 804 is sufficiently large so that dark spots generated by the fiducial regions 804 do not interfere with glints that are generated by illumination source(s) or the pupil of an eye, which need to be captured in images for eye tracking purposes. Because the relative locations of the fiducial regions 804 are known, the dark spots generated by the fiducial regions 804 can be used during calibration to construct the reference coordinate system, described above, that relates where the illumination source(s) are relative to the eye of the user, thereby accounting for tilting, bending, and/or other movements of the components of an artificial reality system.

Figure 8B:
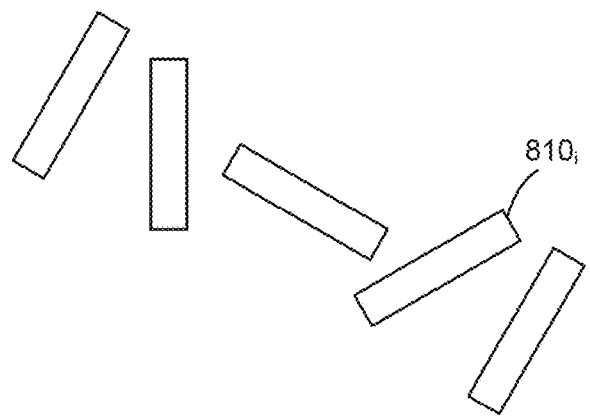
FIG. 8B illustrates in greater detail an imaging region of the PVH combiner of FIG. 8A, according to various embodiments.

FIG. 8B illustrates in greater detail the imaging region 802 of the PVH combiner of FIG. 8A, according to various embodiments. As shown, LC molecules 810$_i$ (referred to herein collectively as LC molecules 810 and individually as an LC molecule 810) in the imaging region 802 form a counterclockwise pattern that diffracts light from an eye towards an imaging device.

Figure 8C:
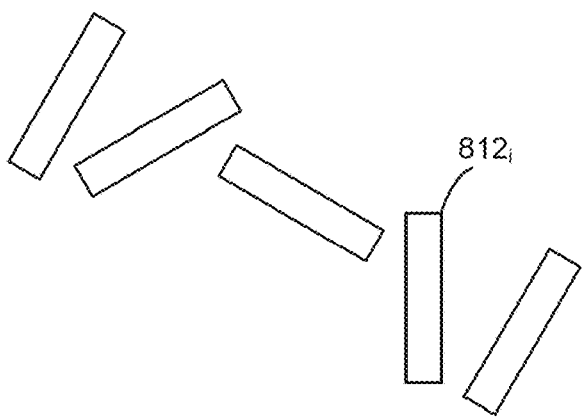
FIG. 8C illustrates in greater detail a fiducial region of the PVH combiner of FIG. 8A, according to various embodiments.

FIG. 8C illustrates in greater detail a fiducial region 804 of the PVH combiner of FIG. 8A, according to various embodiments. In some embodiments, the fiducial regions can be regions of the PVH combiner that are patterned opposite to the patterning of other regions of the PVH combiner. As shown in FIG. 8C, LC molecules 812$_i$ (referred to herein collectively as LC molecules 812 and individually as an LC molecule 812) in a fiducial region 804 form a clockwise pattern that diffracts light away from the imaging device. The clockwise pattern in the fiducial region 804 is the opposite of the clockwise pattern in the imaging region 802, described above in conjunction with FIG. 8B.

In some embodiments, fiducial regions can be regions of a PVH combiner that are patterned differently, but not necessarily opposite to the patterning of other regions of the PVH combiner. For example, the patterning in fiducial regions of a PVH combiner can be at an angle (e.g., a 10 degree angle) relative to the patterning in other regions of the PVH combiner. In some embodiments, fiducial regions of a PVH combiner can be associated with different k-vectors than other regions of the PVH combiner. In such cases, the fiducial regions can be associated with relatively low diffraction efficiency, and the fiducial regions can appear dark in images captured by an imaging device because light is diffracted in a direction away from the imaging device, or is not diffracted, by the fiducial regions.

Figure 10:
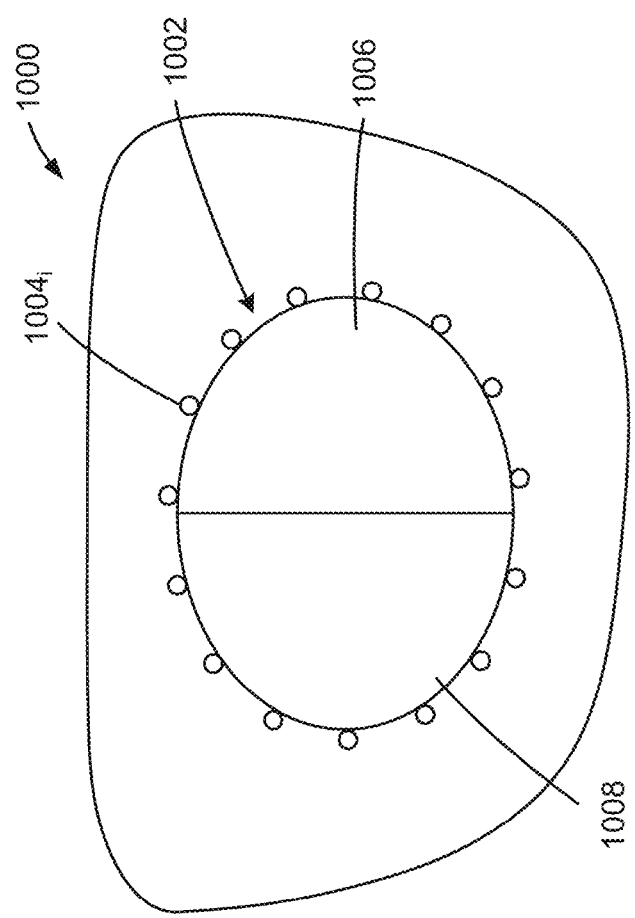
FIG. 10 illustrates an exemplar PVH combiner that includes segmented regions that diffract light at different angles, according to various embodiments.
Figure 11:
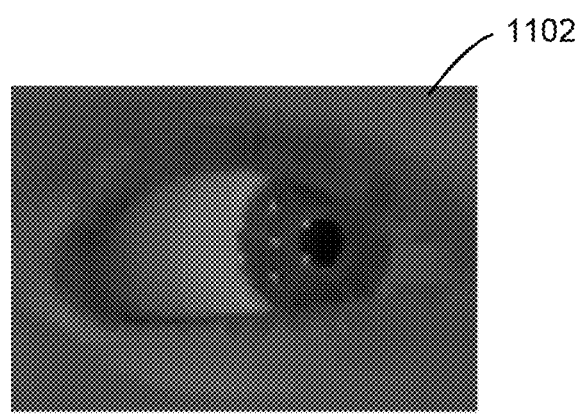
FIG. 11 illustrates exemplar images of an eye from different perspectives, according to various embodiments.
Figure 11:
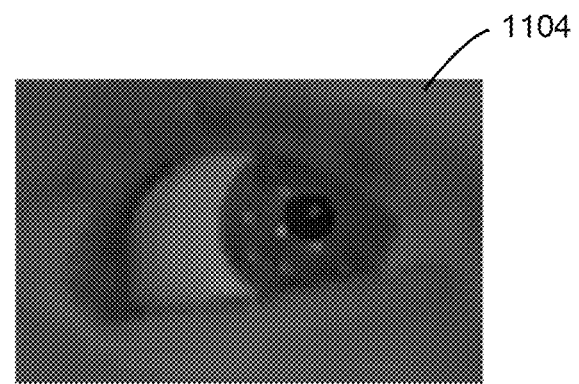

FIG. 10 illustrates an exemplar PVH combiner 1000 that includes segmented regions that diffract light at different angles, according to various embodiments. The PVH combiner 1000 can be included in an artificial reality system, such as the NED 100, the HMD 162, or the NED 300. As shown, an imaging region of the PVH combiner 1000, which diffracts light from an eye towards an imaging device, is segmented into left and right regions 1006 and 1008 that diffract light at different angles towards an imaging device. Although two regions 1006 and 1008 are shown for illustrative purposes, in some embodiments, a PVH combiner can be segmented into two or more regions (e.g., two or three regions) having different diffraction angles such that two or more perspectives of an eye are generated when the PVH combiner diffracts light that reflects from the eye towards an imaging device. For example, the segmented regions could be used to generate images of the eye from two or more perspectives, such as from +10 degrees and from −10 degrees. FIG. 11 illustrates exemplar images 1102 and 1104 of an eye from different perspectives, according to various embodiments. During calibration, images from two or more perspectives can be cross-referenced, and the parallax from the two or more perspectives can be used to construct a reference coordinate system that relates where illumination source(s) are relative to an eye of a user, either alone or in conjunction with the dark spots generated by fiducial regions, described above in conjunction with FIGS. 8A-8C.

Returning to FIG. 10, although a PVH combiner 1000 that is divided into left 1006 and right 1008 regions is shown for illustrative purposes, in some embodiments, an imaging region of a PVH combiner can be segmented into any suitable number of regions with different diffraction angles that have any technically feasible shape and are at any suitable locations. As a general matter, a greater number of segmented regions can improve calibration accuracy, but each segmented region will produce an image with lower resolution, and vice versa. In some embodiments, the sizes and locations of segmented regions (e.g., regions 1006 and 1008) of an imaging region in a PVH combiner are chosen so that, in each of two or more perspectives of an eye generated by the segmented regions, glints and a pupil of the eye are captured for eye tracking purposes.

Generating Virtual Glints Using Polarization Volume Hologram Combiner

Figure 12:
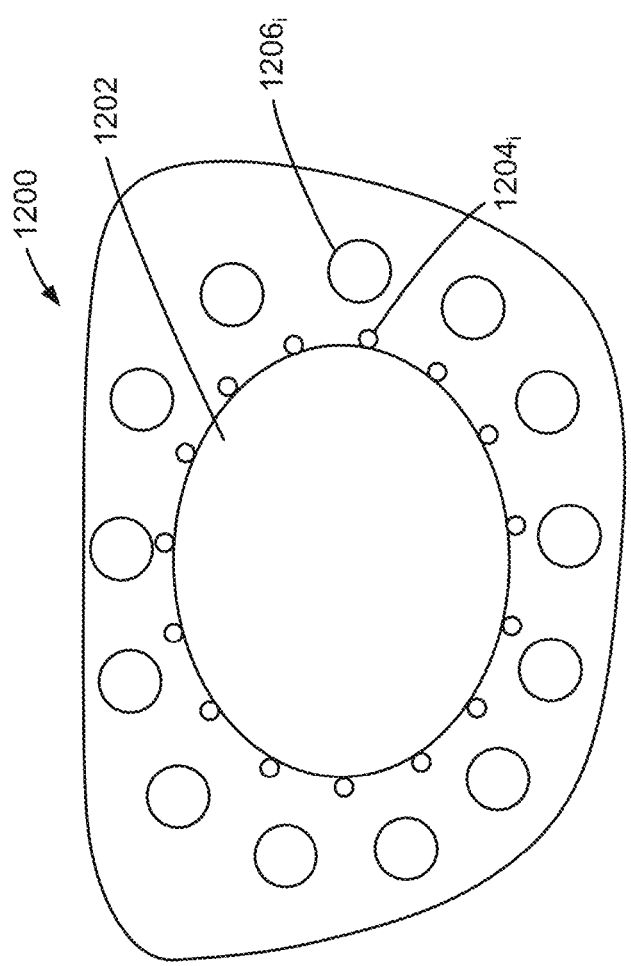
FIG. 12 illustrates an exemplar PVH combiner that includes lens regions, according to various embodiments.

FIG. 12 illustrates an exemplar PVH combiner 1200 that includes lens regions, according to various embodiments. The PVH combiner 1200 can be included in an artificial reality system, such as the NED 100, the HMD 162, or the NED 300. As described, an eye tracking system in an artificial reality system can illuminate each eye of a user using one or more illumination sources and direct light that is reflected from the eye towards an imaging device that captures images used to generate and analyze tracking data related to the eye. However, when conventional illumination source(s) are used to illuminate an eye with glints for eye tracking purposes, the illumination source(s) are oftentimes relatively large in size which can, in turn, increase the overall size of the artificial reality system. In addition, conventional illumination source(s) oftentimes create unwanted artifacts that are visible to the user and bystanders.

As shown in FIG. 12, the PVH combiner 1200 includes multiple lens regions 1206$_i$ (referred to herein collectively as lens regions 1206 and individually as a lens region 1206). Illustratively, the lens regions 1206 are circular in shape and form a ring around an imaging region 1202 and fiducial regions 1204$_i$ (referred to herein collectively as fiducial regions 1204 and individually as a fiducial region 1204), which are similar to the imaging region 802 and the fiducial regions 804, described above in conjunction with FIGS. 8A-8C. More generally, fiducial regions of a PVH combiner can have any technically feasible shape and be at any suitable locations in some embodiments.

Each lens region 1206 is patterned as an off-axis lens that serves as a virtual illumination source by diffracting light from one or more illumination sources to form a glint on an eye. The k-vector and diffraction direction associated with the lens regions 1206 are chosen so that light from the illumination source(s) are diffracted in the appropriate directions to form the glints when the light is reflected from the eye. Each glint is a bright spot that can be used to perform triangulation during eye tracking. In some embodiments, known techniques are employed to track an eye based on the glints and the outline of a pupil of the eye. In such cases, a location and axis (gazing angle of the eye) can be determined from the glints and pupil outline. Advantageously, the lens regions 1206 of the PVH combiner that serve as virtual illumination sources to generate glints can replace physical illumination sources that are oftentimes relatively large in size and can create unwanted artifacts that are visible to the user and bystanders.

Figure 13:
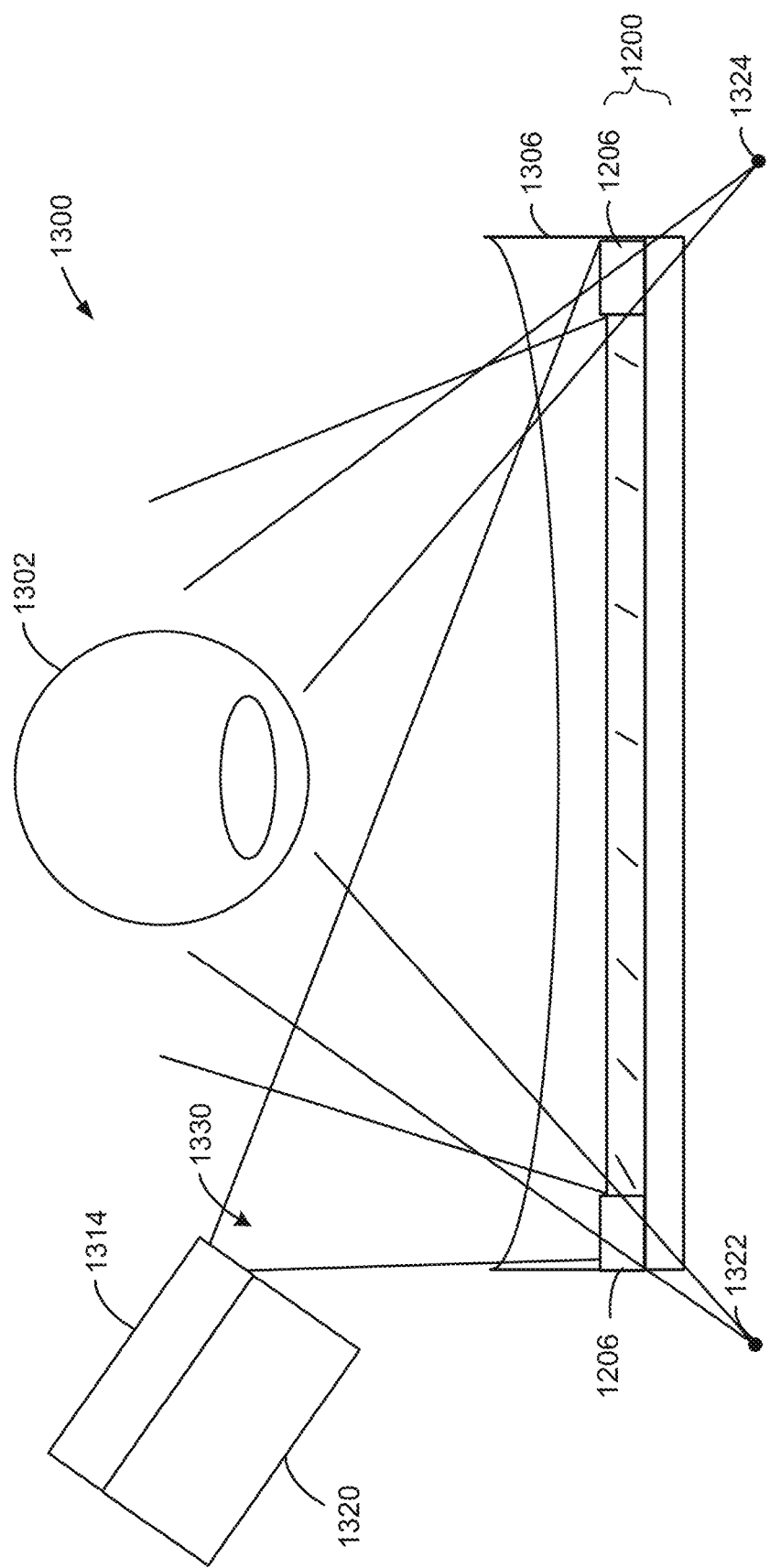
FIG. 13 illustrates a cross-section view of an eye tracking system that includes the exemplar PVH combiner of FIG. 12, according to various embodiments.

FIG. 13 illustrates a cross-section view of an eye tracking system 1300 that includes the exemplar PVH combiner 1200 of FIG. 12, according to various embodiments. The eye tracking system 1300 can be included in an artificial reality system, such as the NED 100, the HMD 162, or the NED 300.

As shown, the eye tracking system 1200 includes the PVH combiner 1200; an imaging device 1320 which is similar to the imaging device 420, described above in conjunction with FIG. 4; and an illumination source 1314. The illumination source 1314 is collocated with the imaging device 420 and emits IR light that is diffracted by the PVH combiner 1200 to illuminate an eye 1302. Although one illumination source 1314 is shown for illustrative purposes, any technically feasible number of illumination sources can be placed at any suitable locations in some embodiments.

As shown, lens regions 1206 of the PVH combiner 1200 diffract light in a manner that resembles light being emitted by virtual illumination sources, shown as virtual illumination sources 1322 and 1324, in order to form glints (not shown) on the eye 1302. The imaging device 1320 captures images of the glints and a pupil of the eye 1302, which can be used to track the eye 1302.

One advantage of the eye tracking systems disclosed herein relative to the prior art is that a PVH combiner with rolling k-vectors can be used in conjunction with lenses that have relatively high prescriptions. Further, a PVH combiner that includes fiducial regions and/or is segmented into regions having different diffraction directions can be used to calibrate an eye tracking system, thereby improving eye tracking accuracy. In addition, using regions of a PVH combiner as virtual illumination sources to generate glints for eye tracking eliminates the need for physical illumination sources that are oftentimes relatively large in size and can create unwanted artifacts that are visible to a user and bystanders. These technical advantages represent one or more technological advancements over prior art approaches.

1. In some embodiments, an eye tracking system comprises one or more illumination sources, one or more imaging devices, and a polarization volume hologram (PVH) combiner that comprises a liquid crystal (LC) layer having a non-uniform chiral concentration across a surface of the PVH combiner.
2. The eye tracking system of clause 1, wherein the LC layer is formed from a plurality of LC layers having different chiral concentrations.
3. The eye tracking system of clauses 1 or 2, wherein a thickness of each LC layer included in the plurality of LC layers across the surface of the PVH combiner is based on a corresponding pattern.
4. The eye tracking system of any of clauses 1-3, wherein the PVH combiner further comprises a substrate, and the LC layer is disposed on top of the substrate.
5. The eye tracking system of any of clauses 1-4, further comprising a prescription lens that is disposed on top of the PVH combiner.
6. The eye tracking system of any of clauses 1-5, wherein each imaging device included in the one or more imaging devices is an infrared (IR) imaging device.
7. The eye tracking system of any of clauses 1-6, wherein the LC layer further comprises at least one of (i) a first plurality of regions that diffract light from an eye away from the one or more imaging devices, or (ii) a second plurality of regions that diffract light from an eye at angles corresponding to different perspectives.
8. The eye tracking system of any of clauses 1-7, wherein the LC layer further comprises a plurality of regions that each diffract light from the one or more illumination sources to form a glint on an eye.
9. In some embodiments, an eye tracking system comprises one or more illumination sources, one or more imaging devices, and a polarization volume hologram (PVH) combiner that comprises at least one of (i) a first plurality of regions that diffract light from an eye at angles corresponding to different perspectives, or (ii) a second plurality of regions that diffract light away from the one or more imaging devices.
10. The eye tracking system of clause 9, wherein the second plurality of regions are outside of a region of the PVH combiner that diffracts light from the eye toward the one or more imaging devices.
11. The eye tracking system of clauses 9 or 10, wherein the first plurality of regions diffract the light from the eye toward the one or more imaging devices, and the second plurality of regions are outside of the first plurality of regions.
12. The eye tracking system of any of clauses 9-11, wherein the first plurality of regions comprises two or three regions.
13. The eye tracking system of any of clauses 9-12, wherein the second plurality of regions include liquid crystal (LC) molecules that are oriented differently from LC molecules included in at least one other region of the PVH combiner.
14. The eye tracking system of any of clauses 9-13, wherein the PVH combiner further comprises a LC layer having a non-uniform chiral concentration across a surface of the PVH combiner.

15. The eye tracking system of any of clauses 9-14, wherein the PVH combiner further comprises a third plurality of regions that each diffract light from the one or more illumination sources to form a glint on an eye.
16. In some embodiments, an eye tracking system comprises one or more illumination sources, one or more imaging devices, and a polarization volume hologram (PVH) combiner that comprises a plurality of regions, wherein each region included in the plurality of regions diffracts light from the one or more illumination sources to form a glint on an eye.
17. The eye tracking system of clause 16, wherein the plurality of regions are outside of another region of the PVH combiner that diffracts light from the eye toward the one or more imaging devices.
18. The eye tracking system of clauses 16 or 17, wherein the one or more illumination sources are disposed adjacent to the one or more imaging devices.
19. The eye tracking system of any of clauses 16-18, wherein the plurality of regions are associated with one or more k-vectors that are different from one or more k-vectors associated with at least one other region of the PVH combiner.
20. The eye tracking system of any of clauses 16-19, wherein the PVH combiner further comprises at least one of (i) a liquid crystal (LC) layer having a non-uniform chiral concentration across a surface of the PVH combiner, (ii) a second plurality of regions that diffract light from an eye at angles corresponding to different perspectives, or (iii) a third plurality of regions that diffract light away from the one or more imaging devices Any and all combinations of any of the claim elements recited in any of the claims and/or any elements described in this application, in any fashion, fall within the contemplated scope of the present disclosure and protection.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The descriptions of the various embodiments have been presented for purposes of illustration, but are not intended to be exhaustive or limited to the embodiments disclosed. Many modifications and variations are apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It is understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. An eye tracking system, comprising:
one or more illumination sources;
one or more imaging devices; and
a polarization volume hologram (PVH) combiner that comprises a liquid crystal (LC) layer having a non-uniform chiral concentration, a non-uniform rotating power, and a non-uniform helical pitch across a plurality of regions of a surface of the PVH combiner,
wherein the PVH combiner is configured to direct light from the one or more illumination sources to a user's eye, direct light from the user's eye to the one or more imaging devices, or a combination thereof.

2. The eye tracking system of claim 1, wherein the LC layer is formed from a plurality of LC layers having different chiral concentrations.

3. The eye tracking system of claim 2, wherein a thickness of each LC layer included in the plurality of LC layers across the surface of the PVH combiner is based on a corresponding pattern.

4. The eye tracking system of claim 1, wherein the PVH combiner further comprises a substrate, and the LC layer is disposed on top of the substrate.

5. The eye tracking system of claim 1, further comprising a prescription lens that is disposed on top of the PVH combiner.

6. The eye tracking system of claim 1, wherein each imaging device included in the one or more imaging devices is an infrared (IR) imaging device.

7. The eye tracking system of claim 1, wherein the LC layer further comprises at least one of (i) a first plurality of regions that diffract the light from the user's eye away from the one or more imaging devices, or (ii) a second plurality of regions that diffract the light from the user's eye at angles corresponding to different perspectives.

8. The eye tracking system of claim 1, wherein the LC layer further comprises a plurality of regions that each diffract light from the one or more illumination sources to form a glint on the user's eye.

9. An eye tracking system, comprising:
one or more illumination sources;
one or more imaging devices; and
a polarization volume hologram (PVH) combiner that comprises at least one of (i) a first plurality of regions across a surface of the PVH combiner and configured to diffract light from an eye at angles corresponding to different perspectives towards the one or more imaging devices to generate images of the eye from the different perspectives, or (ii) a second plurality of regions that diffract light away from the one or more imaging devices such that the one or more imaging devices generate dark spots in an image of the eye.

10. The eye tracking system of claim 9, wherein the second plurality of regions are outside of a region of the PVH combiner that diffracts the light from the eye toward the one or more imaging devices.

11. The eye tracking system of claim 9, wherein the first plurality of regions diffract the light from the eye toward the one or more imaging devices, and the second plurality of regions are outside of the first plurality of regions.

12. The eye tracking system of claim 9, wherein the first plurality of regions comprises two or three regions.

13. The eye tracking system of claim 9, wherein the second plurality of regions include liquid crystal (LC) molecules that are oriented differently from LC molecules included in at least one other region of the PVH combiner.

14. The eye tracking system of claim 9, wherein the PVH combiner further comprises a LC layer having a non-uniform chiral concentration across the surface of the PVH combiner.

15. The eye tracking system of claim 9, wherein the PVH combiner further comprises a third plurality of regions that each diffract light from the one or more illumination sources to form a glint on the eye.

16. An eye tracking system, comprising:
one or more illumination sources;
one or more imaging devices; and
a polarization volume hologram (PVH) combiner that comprises a plurality of regions across a surface of the PVH combiner, wherein each region included in the plurality of regions is configured to diffract light from the one or more illumination sources towards an eye of a user to form a glint on the eye, and wherein the PVH combiner is configured to direct light from the eye toward the one or more imaging devices.

17. The eye tracking system of claim 16, wherein the plurality of regions are outside of another region of the PVH combiner that diffracts the light from the eye toward the one or more imaging devices.

18. The eye tracking system of claim 16, wherein the one or more illumination sources are disposed adjacent to the one or more imaging devices.

19. The eye tracking system of claim 16, wherein the plurality of regions are associated with one or more k-vectors that are different from one or more k-vectors associated with at least one other region of the PVH combiner.

20. The eye tracking system of claim 16, wherein the PVH combiner further comprises at least one of (i) a liquid crystal (LC) layer having a non-uniform chiral concentration across the surface of the PVH combiner, (ii) a second plurality of regions that diffract light from the eye at angles corresponding to different perspectives, or (iii) a third plurality of regions that diffract light away from the one or more imaging devices.

* * * * *